(12) United States Patent
Chiga et al.

(10) Patent No.: US 9,337,513 B2
(45) Date of Patent: May 10, 2016

(54) NON-AQUEOUS ELECTROLYTE SECONDARY BATTERY

(71) Applicant: Panasonic Intellectual Property Management Co., Ltd., Osaka (JP)

(72) Inventors: Takanobu Chiga, Osaka (JP); Takashi Takeuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 58 days.

(21) Appl. No.: 14/512,457

(22) Filed: Oct. 12, 2014

(65) Prior Publication Data

US 2015/0118576 A1    Apr. 30, 2015

(30) Foreign Application Priority Data

Oct. 29, 2013 (JP) .................. 2013-224678

(51) Int. Cl.
*H01M 10/0525* (2010.01)
*H01M 10/0569* (2010.01)
*H01M 10/052* (2010.01)

(52) U.S. Cl.
CPC ........ *H01M 10/0569* (2013.01); *H01M 10/052* (2013.01); *H01M 2300/004* (2013.01); *H01M 2300/0034* (2013.01); *H01M 2300/0037* (2013.01); *H01M 2300/0042* (2013.01)

(58) Field of Classification Search
CPC ............... H01M 10/0569; H01M 2300/0034; H01M 2300/0037; H01M 2300/004; H01M 2300/0042
USPC .................. 429/328, 331, 332, 333
See application file for complete search history.

(56) References Cited

U.S. PATENT DOCUMENTS

2012/0115043 A1    5/2012    Yu et al.

FOREIGN PATENT DOCUMENTS

| JP | 10-233345 | 9/1998 |
| JP | 2005-078820 | 3/2005 |
| JP | 2006-338892 | 12/2006 |
| JP | 2008140760 | * 6/2008 |
| JP | 2012-104335 | 5/2012 |
| JP | 2013-030284 | 2/2013 |
| WO | 2013/100081 | 7/2013 |

* cited by examiner

*Primary Examiner* — Ladan Mohaddes
(74) *Attorney, Agent, or Firm* — McDermott Will & Emery LLP

(57) ABSTRACT

A non-aqueous electrolyte secondary battery which is one example of an embodiment of the present disclosure is a non-aqueous electrolyte secondary battery including a non-aqueous electrolyte which contains a non-aqueous solvent. The non-aqueous solvent contains a fluoroethylene carbonate, a difluorobutylene carbonate, and at least one of a fluorinated chain carbonate and a fluorinated chain carboxylic acid ester, total volumetric contents of which is more than 50 percent with respect to the total volume of the non-aqueous solvent.

5 Claims, No Drawings

NON-AQUEOUS ELECTROLYTE SECONDARY BATTERY

BACKGROUND

1. Technical Field

The present disclosure relates to a non-aqueous electrolyte secondary battery.

2. Description of the Related Art

As an electrolyte solvent of a non-aqueous electrolyte secondary battery, the use of a fluorinated solvent, such as a fluoroethylene carbonate, has been proposed (see Japanese Unexamined Patent Application Publication Nos. 2005-78820, 2013-30284, 10-233345, 2006-338892, and 2012-104335, and International Publication No. 2013/100081). The use of a fluorinated solvent is particularly effective when the battery voltage is high, and for example, cycle characteristics have been improved. For example, Japanese Unexamined Patent Application Publication No. 2005-78820 discloses a non-aqueous electrolyte secondary battery which uses a fluoroethylene carbonate and a fluoroethyl methyl carbonate as an electrolyte solvent.

SUMMARY

However, according to the non-aqueous electrolyte secondary batteries disclosed in the above patent documents, there has been a problem that a metal component is eluted from an active material forming a positive electrode.

An embodiment of the present disclosure provides a non-aqueous electrolyte secondary battery which suppresses gas generation and metal elution at a positive electrode without degrading discharge rate characteristics during charging and preserving.

A non-aqueous electrolyte secondary battery according to one aspect of the present disclosure is a non-aqueous electrolyte secondary battery including a non-aqueous electrolyte which contains a non-aqueous solvent, the non-aqueous solvent contains a fluoroethylene carbonate, a difluorobutylene carbonate, and at least one of a fluorinated chain carbonate and a fluorinated chain carboxylic acid ester, total volumetric contents of which is more than 50 percent with respect to the total volume of the non-aqueous solvent.

The non-aqueous electrolyte secondary battery according to the one aspect of the present disclosure can suppress the gas generation and the metal elution at a positive electrode without degrading the discharge rate characteristics during charging and preserving.

DETAILED DESCRIPTION (Findings as Basis of Present Disclosure)

The non-aqueous electrolyte secondary batteries disclosed in the above patent documents have the problem that the metal component is eluted from the active material of the positive electrode.

The reason of the above problem is believed that chlorine ions generated at a negative electrode attack a fluoroethylene carbonate nucleophilically, and the fluoroethylene carbonate is changed into a vinylene carbonate having a low oxidation resistance. The vinylene carbonate is oxidatively decomposed at a positive electrode, and then, the elution of a metal is believed to occur. Through intensive research on the above problem carried out by the present inventors, it was found that when fluorinated solvents are used in a significantly specific combination, the metal elution can be specifically suppressed, and as a result, the present disclosure was invented.

A non-aqueous electrolyte secondary battery according to one aspect of the present disclosure is a non-aqueous electrolyte secondary battery including a non-aqueous electrolyte which contains a non-aqueous solvent, the non-aqueous solvent contains a fluoroethylene carbonate, a difluorobutylene carbonate, and at least one of a fluorinated chain carbonate and a fluorinated chain carboxylic acid ester, total volumetric contents of which is more than 50 percent with respect to the total volume of the non-aqueous solvent.

Accordingly, without degrading the discharge rate characteristics, the gas generation and the metal elution at the positive electrode during charging and preserving can be suppressed.

Hereinafter, embodiments of the present disclosure will be described in detail.

A non-aqueous electrolyte secondary battery which is an example of the embodiment of the present disclosure comprises a positive electrode, a negative electrode, and a non-aqueous electrolyte containing a non-aqueous solvent. In addition, between the positive electrode and the negative electrode, a least one separator is provided, for example. The non-aqueous electrolyte secondary battery has, for example, a structure in which an electrode body formed by winding the positive electrode and the negative electrode with the separator provided therebetween and the non-aqueous electrolyte are received in an outer package body.

Although not particularly limited, the charge cutoff voltage is, for example, 4.4 V or more, for example, 4.5 V or more, and for example, 4.5 to 5.0 V. The composition of a non-aqueous solvent which will be described later is, for example, for a high voltage application at a battery voltage of 4.4 V or more.

[Positive Electrode]

The positive electrode includes, for example, a positive electrode current collector, such as metal foil, and a positive electrode active material layer formed on the positive electrode current collector. As the positive electrode current collector, for example, there may be used metal foil, such as aluminum foil, which is stable in a potential range of the positive electrode or a film on which a metal, such as aluminum, which is stable in a potential range of the positive electrode is provided. The positive electrode active material layer, for example, contains a conductive agent and a binder besides a positive electrode active material.

As the positive electrode active material, a lithium-containing transition metal oxide containing a transition metal element, such as Co, Mn, or Ni, may be mentioned by way of example. As the lithium-containing transition metal oxide, for example, there may be mentioned $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_4$, $Li_xMn_{2-y}O_4$, $Li_xMn_{2-y}M_yO_4$, $LiMPO_4$, or $Li_2MPO_4F$ (M represents at least one of Na, Mg, Sc, Y, Mn, Fe, Co, Ni, Cu, Zn, Al, Cr, Pb, Sb, and B). In addition, $0<x\le1.2$ (this value is obtained immediately after the active material is formed and increases and decreases by charging and discharging), $0<y\le0.9$, and $2.0\le z\le2.3$ hold. Those materials may be used alone, or at least two types thereof may be used in combination.

The surface of the lithium-containing transition metal oxide may be covered with fine particles of an oxide, such as aluminum oxide ($Al_2O_3$), or an inorganic compound, such as a phosphoric acid compound or a boric acid compound.

The conductive agent described above is used to enhance the electrical conductivity of the positive electrode active material layer. As the conductive agent, a carbon material, such as carbon black, acetylene black, ketjen black, or graphite, may be mentioned by way of example. Those carbon materials may be used alone, or at least two types thereof may be used in combination.

The binder described above is used to maintain a preferable contact state between the positive electrode active material and the conductive agent and to enhance the binding property of the positive electrode active material and the like to the surface of the positive electrode current collector. As the binder, for example, a polytetrafluoroethylene (PTFE), a poly(vinylidene fluoride) (PVdF), or a modified substance thereof may be mentioned. The binder may be used together with a thickening agent, such as a carboxymethyl cellulose (CMC) or a poly(ethylene oxide) (PEO). Those binders may be used alone, or at least two types thereof may be used in combination.

[Negative Electrode]

The negative electrode includes, for example, a negative electrode current collector, such as metal foil, and a negative electrode active material layer formed on the negative electrode current collector. As the negative electrode current collector, for example, there may be used foil formed from a metal, such as copper, which is stable in a potential range of the negative electrode or a film on which a metal, such as copper, which is stable in the potential range of the negative electrode is provided. The negative electrode active material layer, for example, contains a binder besides a negative electrode active material which is capable of occluding and releasing lithium ions. As the binder, although a PTFE or the like may be used as in the case of the positive electrode, a styrene-butadiene copolymer (SBR) or a modified substance thereof is, for example, used. The binder may be used together with a thickening agent, such as a CMC.

As the negative electrode active material, for example, there may be used natural graphite, artificial graphite, lithium, silicon, carbon, tin, germanium, aluminum, lead, indium, gallium, a lithium alloy, carbon and silicon in each of which lithium is occluded in advance, and an alloy and a mixture of those mentioned above.

[Non-Aqueous Electrolyte]

The non-aqueous electrolyte includes a non-aqueous solvent and an electrolytic salt dissolved therein. The non-aqueous solvent contains a fluoroethylene carbonate (hereinafter referred to as "FEC"), a difluorobutylene carbonate (hereinafter referred to as "DFBC"), and at least one of a fluorinated chain carbonate and a fluorinated chain carboxylic acid ester, total volumetric contents of which is required to be more than 50 percent with respect to the total volume of the non-aqueous solvent, and is, for example, 60 percent by volume or more, for example, 70 percent by volume or more, and for example, 80 percent by volume or more. As a result, the gas generation and the metal elusion at the positive electrode during charging and preserving can be suppressed without degrading the discharge rate characteristics. In addition, the non-aqueous electrolyte is not limited to a liquid electrolyte (non-aqueous electrolyte solution) and may also be a solid electrolyte using a gel polymer or the like.

In an electrolyte solution containing a FEC, chlorine ions generated at the negative electrode nucleophilically attack the FEC, and a vinylene carbonate (VC) having a low oxidation resistance is liable to be generated. In addition, when the VC thus generated is oxidatively decomposed at the positive electrode, it is believed that the metal elution occurs. However, only in the case in which an electrolyte solution containing a FEC, a DFBC, and at least one of a fluorinated chain carbonate and a fluorinated chain carboxylic acid ester is used, the metal elusion can be suppressed as described above. The reason for this is believed that by the use of this electrolyte solution, since concerted reduction decomposition occurs on the negative electrode, a dense negative electrode coating film formed thereby suppresses the decomposition of the FEC.

The above FEC is monofluoroethylene carbonate (4-fluoroethylene carbonate). The content of the FEC is, for example, 2 to 40 percent by volume with respect to the total volume of the non-aqueous solvent. Accordingly, preferable discharge rate characteristics and effect of suppressing metal elution are likely to be simultaneously achieved.

The above DFBC is, for example, 4,5-difluorobutylene carbonate or 4,4-difluoropropylene carbonate. Among those mentioned above, a difluorobutylene carbonate is, for example, 4,5-difluorobutylene carbonate or 4,5-difluoro-4,5-dimethyl-1,3-dioxolane-2-on.

The above DFBC may be used alone, or at least two types thereof may be used in combination. The content of the DFBC is, for example, 2 to 40 percent by volume with respect to the total volume of the non-aqueous solvent. Accordingly, preferable discharge rate characteristics and effect of suppressing metal elution are likely to be simultaneously achieved. In addition, the amount of gas generated during charging and preserving can also be reduced.

As the above fluorinated chain carbonate, for example, there may be, for example, used a carbonate obtained by substituting by a fluorine atom, at least one hydrogen of a lower chain carbonic acid ester, such as dimethyl carbonate, ethyl methyl carbonate, diethyl carbonate, methyl propyl carbonate, ethyl propyl carbonate, or methyl isopropyl carbonate. Among those mentioned above, for example, a fluorinated ethyl methyl carbonate (FEMC) or 2,2,2-trifluoroethyl methyl carbonate may be mentioned.

As the above fluorinated chain carboxylic acid ester, for example, an ester obtained by substituting by a fluorine atom, at least one hydrogen of a lower chain carboxylic acid ester, such as methyl acetate, ethyl acetate, propyl acetate, methyl propionate, or ethyl propionate may be, for example, used. Among those mentioned above, for example, a fluorinated ethyl acetate, a fluorinated methyl propionate (FMP), or methyl 3,3,3-trifluoropropionate may be mentioned.

The fluorinated chain carbonate and the fluorinated chain carboxylic acid ester may be used alone, or at least two types thereof may be used in combination. In particular, those compounds function to decrease the viscosity of an electrolytic solution and to improve the discharge rate characteristics. The content of those compounds is, for example, 40 to 95 percent by volume with respect to the total volume of the non-aqueous solvent.

As the non-aqueous solvent, a fluorinated solvent other than the above fluorinated solvents or a non-fluorinated solvent may also be used together with the above fluorinated solvents. However, the content of the solvent other than the above fluorinated solvents is required to be less than 50 percent by volume with respect to the total volume of the non-aqueous solvent, for example, less than 40 percent by volume, for example, less than 30 percent by volume, and for example, less than 20 percent by volume. As the non-fluorinated solvent, for example, a cyclic carbonate, a chain carbonate, a carboxylic acid ester, a cyclic ether, a chain ether, a nitrile, an amide, or a mixture thereof may be mentioned.

As an example of the cyclic carbonate, for example, ethylene carbonate, propylene carbonate, or butylene carbonate may be mentioned.

As an example of the chain carbonate, for example, dimethyl carbonate, methyl ethyl carbonate, diethyl carbonate, methyl propyl carbonate, ethyl propyl carbonate, or methyl isopropyl carbonate may be mentioned.

As an example of the carboxylic acid ester, for example, methyl acetate, ethyl acetate, propyl acetate, methyl propionate, ethyl propionate, or γ-butyrolactone may be mentioned.

As an example of the cyclic ether, for example, 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, or a crown ether may be mentioned.

As an example of the chain ether, for example, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1.1-dimethoxymethane, 1,1-diethoxyethane, triethylene glycol dimethyl ether, or tetraethylene glycol dimethyl ether may be mentioned.

As an example of the nitrile, acetonitrile may be mentioned, and as an example of the amide, dimethylformamide may be mentioned.

The electrolytic salt described above is, for example, a lithium salt. As the lithium salt, a salt which has been generally used as a supporting salt in a related non-aqueous electrolyte secondary battery may be used. As an example, $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (l and m each indicate an integer of 1 or more), $LiC(C_pF_{2p+1}SO_2)(C_qF_{2q+1}SO_2)(C_rF_{2r+1}SO_2)$ (p, q, and r each indicate an integer of 1 or more), $Li[B(C_2O_4)_2]$ (bis(oxalate)lithium borate (LiBOB)), $Li[B(C_2O_4)F_2]$, $Li[P(C_2O_4)F_4]$, or $Li[P(C_2O_4)F_2]$ may be mentioned. Those lithium salts may be used alone, or at least two types thereof may be used in combination.

[Separator]

As the separator, a porous sheet having ion permeability and insulating properties may be used. As an example of the porous sheet, a fine porous thin film, a woven cloth, or an unwoven cloth may be mentioned. As a material for the separator, a polyolefin, such as a polyethylene or a polypropylene is, for example, used.

EXAMPLES

Hereinafter, although the present disclosure will be further described with reference to examples, the present disclosure is not limited to the following examples.

Example 1

Formation of Positive Electrode

After a mixture containing 92 percent by mass of $LiNi_{0.33}Co_{0.33}Mn_{0.33}O_2$, 5 percent by mass of acetylene black, and 3 percent by mass of a poly(vinylidene fluoride) was formed, this mixture was kneaded with N-methyl-2-pyrollidone to form a slurry. Subsequently, on an aluminum foil current collector functioning as a positive electrode current collector, the slurry thus prepared was applied, followed by performing drying and rolling, so that a positive electrode was formed.

[Formation of Negative Electrode]

After a mixture containing 98 percent by mass of graphite, 1 percent by mass of a sodium carboxymethyl cellulose, and 1 percent by mass of a styrene-butadiene copolymer was formed, this mixture was kneaded with water to form a slurry.

Subsequently, on a copper foil current collector functioning as a negative electrode current collector, the slurry thus prepared was applied, followed by performing drying and rolling, so that a negative electrode was formed.

[Formation of Non-Aqueous Electrolyte]

A solvent containing 4-fluoroethylene carbonate (FEC), trans-4,5-difluoro-4,5-dimethyl-1,3-dioxolane-2-on (DFBC), and 2,2,2-trifluoroethyl methyl carbonate at a volume ratio of 10:15:75 was prepared, and $LiPF_6$ was added to the solvent thus prepared to have a concentration of 1.0 mol/l, so that a non-aqueous electrolyte was formed.

[Formation of Battery]

To the positive electrode (30×40 mm) and the negative electrode (32×42 mm) thus formed, respective lead terminals were fitted. Next, an electrode body was formed so that the positive electrode and the negative electrode faced each other with at least one separator provided therebetween, and this electrode body was sealed in an outer package body together with the non-aqueous electrolyte. Accordingly, a battery A1 having a designed capacity of 50 mAh was formed. The battery A1 thus formed was charged at a constant current of 0.5 It (25 mA) until the voltage reached 4.6 V. Next, after the battery A1 was charged at a constant voltage of 4.6 V until the current reached 0.05 It (2.5 mA), the battery A1 was left stand still for 20 minutes. Subsequently, discharge was performed at a constant current of 0.5 It (25 mA) until the voltage reached 2.5 V. This charge and discharge test was performed 5 cycles, so that the battery A1 was stabilized.

Example 2

Except that methyl 3,3,3-trifluoropropionate (FMP) was used instead of using FEMC, a battery A2 was formed in a manner similar to that in Example 1.

Example 3

Except that ethyl methyl carbonate (EMC) was used instead of using part of FMP so that FEC, DFBC, FMP, and EMC had a volume ratio of 10:15:45:30, a battery A3 was formed in a manner similar to that in Example 1.

Example 4

Except that the volume ratio of FEC, DFBC, and FMP was set to 5:5:90, a battery A4 was formed in a manner similar to that in Example 2.

Example 5

Except that the volume ratio of FEC, DFBC, and FMP was set to 25:15:60, a battery A5 was formed in a manner similar to that in Example 2.

Example 6

Except that the volume ratio of FEC, DFBC, and FMP was set to 15:25:60, a battery A6 was formed in a manner similar to that in Example 2.

Comparative Examples 1 to 12

Except that as the non-aqueous electrolyte solvent, the solvents shown in Table 1 were used, batteries X1 to X12 were each formed in a manner similar to that in Example 1.

[Evaluation of Amount of Generated Gas and Amount of Metal Elution after Charging and Storage]

After the batteries of Examples and Comparative Examples were each charged at a constant current of 0.5 It (25 mA) until the voltage reached 4.6 V, the batteries were each further charged at a constant voltage of 4.6 V until the current reached 0.05 It (2.5 mA). Subsequently, in a constant-temperature bath at 60° C., the batteries were stored for 10 days. Since a large amount of gas is generated from some batteries, the storage period of those batteries was set to 3 days. Next, after the batteries were cooled to room temperature, the gas thus generated was quantitatively analyzed using a gas chromatography.

In addition, after the batteries were disassembled, the negative electrodes (32×42 mm) were recovered. The negative electrode thus recovered was heated after an acid was added thereto, and acid insoluble components were removed by filtration. Subsequently, a quantitative analysis of transition metals (Co, Ni, Mn) contained in the solution was performed by using ICP. The sum of the amounts of Co, Ni, and Mn thus obtained was divided by the weight of the positive electrode active material, and this value thus obtained was regarded as the amount of metals eluted from the positive electrode active material.

[Evaluation of Discharge Rate Characteristics]

After the batteries of Examples and Comparative Examples were each charged at a constant current of 0.5 It (25 mA) until the voltage reached 4.6 V, the batteries were each further charged at a constant voltage of 4.6 V until the current reached 0.05 It (2.5 mA). Subsequently, the batteries were left stand still for 20 minutes and were then discharged at a constant current of 5 It (250 mA) until the voltage reached 2.5 V, so that a discharge capacity at 5 It was measured.

Table 1 shows the evaluation results and the like of the batteries formed in Examples and Comparative Examples. The evaluation result of the battery X1 of Comparative Example 1 was used as the standard (100%), and the evaluation results of the other batteries were relatively shown. In addition, the amount of metal elution (μg) is the amount of elution per 1 g of the positive electrode active material. Since the batteries X3 and X4 of Comparative Examples 3 and 4 each had a large gas generation amount, the storage test was stopped after three days passed (the data was obtained on the third day of the storage test).

As shown in Table 1, in the batteries A1 to A6 of Examples, preferable discharge rate characteristics can be maintained, and at the same time, the gas generation and the metal elution at the positive electrode during charging and preserving can be suppressed. As apparent from the evaluation results of Comparative Examples, the effect described above can be specifically obtained only when FEC, DFBC, and FEMC or FMP are used in an amount of more than 50 percent by volume with respect to the total volume of the solvent of the electrolyte solution.

Table 2 shows the evaluation results of the batteries A1 and X1 to X5, each of which used FEC and FEMC.

TABLE 2

| | Composition of electrolyte solution ( ) indicates mixing ratio (vol %) | Discharge capacity (mAh) | | Amount of generated gas (ml) | | Amount of metal elution (μg) | |
|---|---|---|---|---|---|---|---|
| A1 | FEC/DFBC/FEMC(10/15/75) | 13.5 | 105% | 1.4 | 74% | 210 | 34% |
| X1 | FEC/FEMC(25/75) | 12.8 | 100% | 1.9 | 100% | 623 | 100% |
| X2 | FEC/CH$_2$F-EC/FEMC(10/15/75) | 6.8 | 53% | 1.5 | 79% | 759 | 122% |
| X3 | FEC/4F-PC/FEMC(10/15/75) | 16.4 | 128% | 43.4 | 2284% | 4277 | 687% |
| X4 | FEC/TMFEC/FEMC(10/15/75) | 11.2 | 87% | 13.6 | 716% | 409 | 66% |
| X5 | FEC/DFEC/FEMC(10/15/75) | 12.0 | 94% | 2.1 | 111% | 531 | 85% |

In the battery X1, FEC and FEMC were used as the electrolyte solution, and this combination has been proposed as a preferable composition for a high voltage application. In the battery X2 in which CH$_2$F-EC was added to the electrolyte solution of the battery X1, although the generation of gas (hereinafter referred to as "storage gas") during charging and preserving was suppressed as compared to that of the battery X1, the amount of metal elution was increased. In the battery X3 in which 4F-PC was added to the electrolyte solution of the battery X1 and the battery X4 in which TMFEC was added thereto, a large amount of storage gas was generated (the storage test was stopped after three days passed). In

TABLE 1

| | Composition of electrolyte solution ( ) indicates mixing ratio (vol %) | Discharge capacity (mAh) | | Amount of generated gas (ml) | | Amount of metal elution (μg) | |
|---|---|---|---|---|---|---|---|
| A1 | FEC/DFBC/FEMC(10/15/75) | 13.5 | 105% | 1.4 | 74% | 210 | 34% |
| A2 | FEC/DFBC/FMP(10/15/75) | 39.3 | 306% | 1.2 | 63% | 506 | 81% |
| A3 | FEC/DFBC/FMP/EMC(10/15/45/30) | 39.8 | 310% | 1.4 | 74% | 598 | 96% |
| A4 | FEC/DFBC/FMP(5/5/90) | 33.1 | 258% | 0.9 | 47% | 563 | 90% |
| A5 | FEC/DFBC/FMP(25/15/60) | 37.1 | 289% | 1.6 | 84% | 511 | 82% |
| A6 | FEC/DFBC/FMP(15/25/60) | 34.7 | 271% | 1.1 | 58% | 487 | 78% |
| X1 | FEC/FEMC(25/75) | 12.8 | 100% | 1.9 | 100% | 623 | 100% |
| X2 | FEC/CH$_2$F-EC/FEMC(10/15/75) | 6.8 | 53% | 1.5 | 79% | 759 | 122% |
| X3 | FEC/4F-PC/FEMC(10/15/75) | 16.4 | 128% | 43.4 | 2284% | 4277 | 687% |
| X4 | FEC/TMFEC/FEMC(10/15/75) | 11.2 | 87% | 13.6 | 716% | 409 | 66% |
| X5 | FEC/DFEC/FEMC(10/15/75) | 12.0 | 94% | 2.1 | 111% | 531 | 85% |
| X6 | DFBC/FEMC(25/75) | 6.3 | 49% | 0.9 | 47% | 422 | 68% |
| X7 | FEC/FMP(25/75) | 43.6 | 340% | 2.1 | 111% | 855 | 137% |
| X8 | DFBC/FMP(25/75) | 22.2 | 173% | 0.8 | 42% | 710 | 114% |
| X9 | FEC/EMC(25/75) | 44.7 | 349% | 3.6 | 189% | 2268 | 364% |
| X10 | FEC/DFBC/EMC(10/15/75) | 402.0 | 314% | 2.3 | 121% | 1711 | 275% |
| X11 | DFBC/EMC(25/75) | 23.2 | 181% | 1.3 | 68% | 1375 | 221% |
| X12 | FEC/DFBC/FMP/EMC(10/15/25/50) | 40.1 | 313% | 2.0 | 105% | 1054 | 169% |

DFEC: 4,5-difluoro-1,3-dioxolane-2-on
CH$_2$F-EC: 4-fluoromethyl-1,3-dioxolane-2-on
4F-PC: 4-fluoro-4-methyl-1,3-dioxolane-2-on
TMFEC: 4-fluoro-4,5,5-trimethyl-1,3-dioxolane-2-on addition, in the battery X5 in which DFEC was added to the electrolyte solution of the battery X1, although the amount of metal elution was reduced as compared to that of the battery X1, the amount of storage gas was increased. It was found that only in the battery A1 in which DFBC was added to the electrolyte solution of the battery X1, the amount of storage gas and the amount of metal elution could both be reduced.

Table 3 shows the evaluation results of the batteries A1 and X6, each of which used DFBC.

TABLE 3

| Composition of electrolyte solution ( ) indicates mixing ratio (vol %) | Discharge capacity (mAh) | | Amount of generated gas (ml) | | Amount of metal elution (μg) | |
|---|---|---|---|---|---|---|
| A1 | FEC/DFBC/FEMC(10/15/75) | 13.5 | 105% | 1.4 | 74% | 210 | 34% |
| X6 | DFBC/FEMC(25/75) | 6.3 | 49% | 0.9 | 47% | 422 | 68% |

In the battery X6 in which as the electrolyte solution, only DFBC and FEMC were used, although the amount of preserving gas and the amount of metal elution were reduced as compared to those of the battery X1, the discharge rate characteristics were remarkably degraded. The reason for this is believed that since the dielectric constant of DFBC is lower than that of FEC, lithium is not dissociated into ions. From the results described above, it can be understood that in order to reduce the amount of metal elution while sufficient discharge rate characteristics are maintained, FEC and DFBC are essentially required.

Table 4 shows the evaluation results of the batteries A2, X7 and X8, each of which used FMP.

TABLE 4

| Composition of electrolyte solution ( ) indicates mixing ratio (vol %) | Discharge capacity (mAh) | | Amount of generated gas (ml) | | Amount of metal elution (μm) | |
|---|---|---|---|---|---|---|
| A2 | FEC/DFBC/FMP(10/15/75) | 39.3 | 306% | 1.2 | 63% | 506 | 81% |
| X7 | FEC/FMP(25/75) | 43.6 | 340% | 2.1 | 111% | 855 | 137% |
| X8 | DFBC/FMP(25/75) | 22.2 | 173% | 0.8 | 42% | 710 | 114% |

In the battery A2 in which as the electrolyte solution, FEC, DFBC, and FMP were used, the amount of storage gas, the amount of metal elusion, and the discharge rate characteristics were all superior to those of the battery X1. In addition, compared to the battery X7 in which FEC and FMP were only used and the battery X8 in which DFBC and FMP were only used, in the battery A2, the amount of metal elusion was small, and hence, the synergetic effect of FEC and DFBC could be confirmed also in the case of using FMP.

Table 5 shows the evaluation results of the batteries A3 and X9 to X12, each of which used EMC.

TABLE 5

| Composition of electrolyte solution ( ) indicates mixing ratio (vol %) | Discharge capacity (mAh) | | Amount of generated gas (ml) | | Amount of metal elution (μg) | |
|---|---|---|---|---|---|---|
| A3 | FEC/DFBC/FMP/EMC(10/15/45/30) | 39.8 | 310% | 1.4 | 74% | 598 | 96% |
| X9 | FEC/EMC(25/75) | 44.7 | 349% | 3.6 | 189% | 2268 | 364% |
| X10 | FEC/DFBC/EMC(10/15/75) | 40.2 | 314% | 2.3 | 121% | 1711 | 275% |
| X11 | DFBC/EMC(25/75) | 23.2 | 181% | 1.3 | 68% | 1375 | 221% |
| X12 | FEC/DFBC/FMP/EMC(10/15/25/50) | 40.1 | 313% | 2.0 | 105% | 1054 | 169% |

In the battery X9 in which as the electrolyte solution, FEC and EMC were used and in the battery X10 in which FEC, DFBC, and EMC were used, the amount of preserving gas and the amount of metal elusion were increased as compared to those of the battery X1. In addition, in the battery X11 in which DFBC and EMC were used, although the amount of preserving gas was reduced, the amount of metal elusion was increased. From the results described above, it can be understood that in order to reduce the amount of metal elusion, FEC, DFBC, and at least one of FEMC and FMP are required to be mixed with each other.

In addition, from the evaluation results of the battery A3, it is found that besides FEC, DFBC, and FMP (FEMC), a non-fluorinated solvent which has been used in a related non-aqueous electrolyte secondary battery may also be added. However, since the non-fluorinated solvent is inferior in terms of oxidation resistance, the rate thereof in the electrolyte solvent must be set to less than 50 percent by volume (from the evaluation results of the battery X12).

What is claimed is:

1. A non-aqueous electrolyte secondary battery comprising:
    a non-aqueous electrolyte including a non-aqueous solvent,
    wherein the non-aqueous solvent contains a fluoroethylene carbonate, a difluorobutylene carbonate, and at least one of a fluorinated chain carbonate and a fluorinated chain carboxylic acid ester, total volumetric contents of which is more than 50 percent with respect to the total volume of the non-aqueous solvent.

2. The non-aqueous electrolyte secondary battery according to claim 1,
    wherein with respect to the total volume of the non-aqueous solvent, the volumetric content of the fluoroethylene carbonate is 2 to 40 percent, the volumetric content of the difluorobutylene carbonate is 2 to 40 percent, the volumetric content of the fluorinated chain carbonate and the fluorinated chain carboxylic acid ester is 40 to 95 percent, and the sum of the volumetric contents of those compounds is 70 percent by volume or more.

3. The non-aqueous electrolyte secondary battery according to claim 1,
    wherein the difluorobutylene carbonate is 4,5-difluoro-4,5-dimethyl-1,3-dioxolane-2-on.

4. The non-aqueous electrolyte secondary battery according to claim 1,
    wherein the fluorinated chain carbonate is 2,2,2-trifluoroethyl methyl carbonate, and
    the fluorinated chain carboxylic acid ester is methyl 3,3,3-trifluoropropionate.

5. The non-aqueous electrolyte secondary battery according to claim 1,
    wherein the non-aqueous electrolyte secondary battery has a charge cutoff voltage of 4.4 to 5.0 V.

* * * * *